United States Patent [19]

Pfundstein

[11] 4,448,456

[45] May 15, 1984

[54] WIRE SPOKE WHEEL HUB ASSEMBLY

[76] Inventor: Dean W. Pfundstein, 866 Hummingbird Dr., San Jose, Calif. 95125

[21] Appl. No.: 354,583

[22] Filed: Mar. 4, 1982

[51] Int. Cl.³ .......................... B60B 1/04; B60B 27/06
[52] U.S. Cl. .......................... 301/58; 301/59; 301/74; 301/108 SC
[58] Field of Search ......... 305/1, 9 AN, 9 DN, 9 SB, 305/9 SC, 37 AT, 37 SS, 37 SC, 37 H, 58, 59, 73, 74, 80, 121, 108 SC, 108 S; 301/58, 59, 74, 108 SC

[56] References Cited

U.S. PATENT DOCUMENTS

| | | | |
|---|---|---|---|
| 1,316,997 | 9/1919 | Ash | 301/9 SC |
| 1,340,773 | 5/1920 | Jinkner | 301/58 X |
| 1,456,952 | 5/1923 | Van Meter | 301/9 SB |
| 2,890,910 | 6/1959 | Bern | 301/9 DN |

FOREIGN PATENT DOCUMENTS

| | | | |
|---|---|---|---|
| 444172 | 9/1925 | Fed. Rep. of Germany | 301/9 SC |
| 610007 | 8/1926 | France | 301/9 SB |
| 1047490 | 12/1953 | France | 301/9 DN |

*Primary Examiner*—David A. Scherbel
*Attorney, Agent, or Firm*—John J. Leavitt

[57] ABSTRACT

Presented is a wire spoke wheel and hub assembly that simulates the popular racing wheels in that it projects a small diameter hub, while providing the requisite load bearing characteristics so necessary with modern day wheels. Structurally, the assembly includes an adaptor removably bolted by appropriate lugs to the brake drum or wheel support plate of an automobile, and the wheel is then detachably mounted on the adaptor member.

5 Claims, 2 Drawing Figures

WIRE SPOKE WHEEL HUB ASSEMBLY

BACKGROUND OF THE INVENTION

1. Field of the Invention

This invention relates to automobile wheels, and particularly to wire spoke wheels such as racing wheels which project a small diameter hub assembly to the view of the observer.

2. Description of the Prior Art

The prior art relating to this invention is believed found in Class 301. A search through this class has revealed the existence of U.S. Pat. Nos. 1,943,151; 1,963,230; 2,042,714; 2,136,137; 2,619,389; 2,779,630 and 4,138,160. U.S. Pat. No. 1,943,151 relates to a demountable wire spoke wheel in which the wheel is bolted to an extension of the brake drum in the form of an integral hub 10 provided with a radially extending flange. There is nothing in this patent that suggests an auxiliary adaptor member bolted to the primary hub or brake drum structure, with the wheel then being detachably bolted to the auxiliary hub structure.

U.S. Pat. No. 1,963,230 is also directed to a wire spoke wheel structure in which the problem is the intersection of the spokes in space rather than attachment of the wheel to a vehicle. Thus, the teaching of this patent is not directed to the solution of the problem of the presentation of a small diameter hub structure for wire spoke wheels for automobiles which will simulate racing wheels.

U.S. Pat. No. 2,042,714 also relates to a wire spoke wheel and the problem revealed by this patent is the construction of a wire spoke wheel and its assembly in such a way that the spokes are placed in compression by the act of assemblying the wheel. Again, there is nothing in this patent that suggests an auxiliary hub structure detachably mounted by appropriate lugs to the conventional bolt circle of a brake drum, with the wheel subsequently being detachably secured to the auxiliary hub structure.

U.S. Pat. No. 2,136,137 teaches a structure in which a wire spoke wheel is provided with a cover to make the wheel look like a disk wheel rather than a spoke wheel. The patent is directed toward the structure for attaching such a "hub cap".

U.S. Pat. No. 2,619,389 teaches the use of a hub adaptor the purpose of which is to reinforce the wheel hub and lugs which secure the wheel hubs to flanges of axles. There is nothing in this patent that suggests the use of such an adaptor for mounting a wheel on a conventional hub.

U.S. Pat. No. 2,779,630 teaches another adaptor used for a different purpose. In this case, the conventional drum has six lugs and the first adaptor is arranged to be secured to the conventional lug bolt circle. A second adaptor member is provided that slips over the first adaptor and is secured thereto by radially extending bolts. The second adaptor member carries a five bolt circle for receiving lug bolts, thus permitting attachment of a five-bolt wheel to a six-bolt drum.

It is clear that none of these prior art patents suggest the problem of providing an auxiliary structure which projects a reduced diameter for aesthetic reasons, yet which is attached to the conventional drum or bolt circle of a wheel mounting plate in such a way as to distribute the load from the wheel in a safe manner.

Accordingly, one of the objects of the present invention is the provision of an adaptor for attachment to a conventional bolt circle on an automobile under-carriage which permits the fastening to such adaptor of a wire spoke wheel having a reduced diameter hub.

Another object of the invention is the provision of a wire spoke wheel assembly, including an adaptor for attachment of the wire spoke wheel to the wheel support plate or brake drum assembly of an automobile, designed to project a relatively small diameter hub section while distributing the load imposed on the wheel to the supporting under carriage of the automobile.

Still another object of the invention is the provision of a wire spoke wheel designed to discourage the theft of such wheels by covering and disguising the access plate to the lug nuts that retain the wheel on the adaptor.

Another problem that has been prevalent with wire spoke wheels has been the fact that tubeless tires cannot generally be used with such wheels. To adapt a wire spoke wheel for use with a tubeless tire, it has been the custom to fill or coat the drop-center section of the wheel with some type of sealing material, such as silicone rubber. This is an expensive procedure, adds weight to the wheel and if not properly applied makes it difficult to balance the wheel. Accordingly, another object of the present invention is the provision of a wire spoke wheel in which each of the individual spokes in its attachment to the drop-center wheel section is sealed to prevent the escape of air therepast.

The invention possesses other objects and features of advantage, some of which, with the foregoing, will be apparent from the following description and drawings. It is to be understood however that the invention is not limited to the embodiment illustrated and described, since it may be embodied in various forms within the scope of the appended claims.

SUMMARY OF THE INVENTION

In terms of broad inclusion, the wire spoke wheel and hub assembly of the invention comprises an adaptor member including a cylindrical portion and a radially extending flange portion adapted to be demountably attached to the conventional bolt circle of a wheel support plate or brake drum. The cylindrical portion of the adaptor is relatively small in diameter and projects coaxially with respect to the axle on which the wheel is to be mounted. The cylindrical section of the adaptor forms a rigid support for the wheel hub which slips coaxially onto the cylindrical surface of the adaptor and which is detachably secured thereto by appropriate lug bolts. In one aspect of the invention, the wheel hub is provided with a cylindrical flange the interior periphery of which is proportioned to fit snugly about the outer periphery of the radial flange of the adaptor so as to provide additional bearing surface to withstand extraordinarily heavy loads. Means are provided on the wheel hub for concealing the location of the detachable lug bolts or cap screws that retain the wheel hub to the adaptor. Additionally, means are provided in association with each of the spokes where it attaches to the wheel to seal the union therebetween and preclude the escape of air from a tubeless tire mounted on the wheel.

DESCRIPTION OF THE PREFERRED EMBODIMENTS

Figure 1:
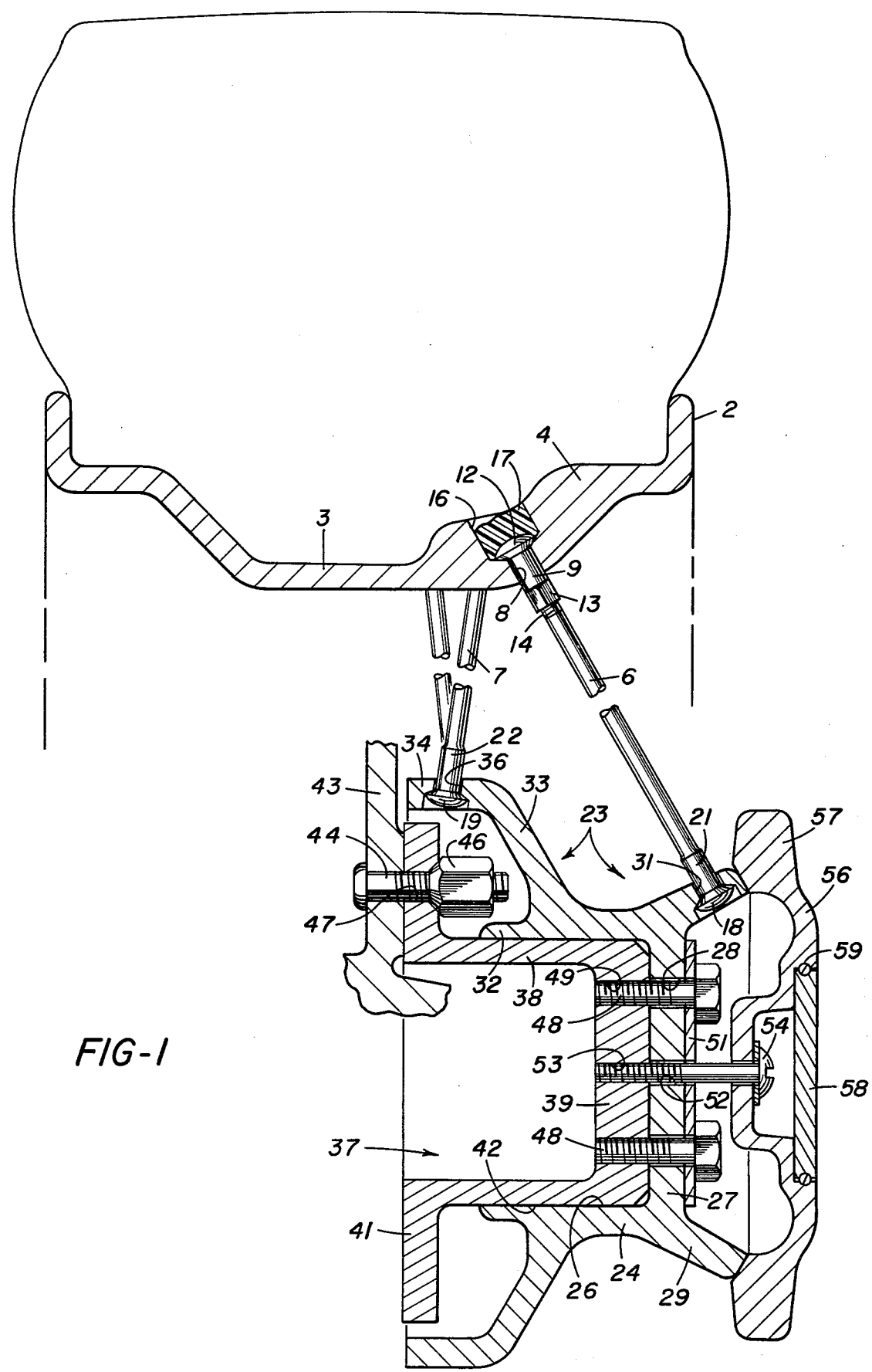
FIG. 1 is a fragmentary cross-sectional view through a section of the wheel and through the central axis of the hub assembly therefor, and illustrating the preferred embodiment of the invention.

In terms of greater detail, the wire spoke wheel and hub assembly of the invention comprises a rim member designated generally by the numeral 2, preferably having a drop-center section 3 a portion 4 of which as illustrated in the drawings is of somewhat thicker cross section to provide adequate mounting means for a multiplicity of wire spokes 6 and 7. Each of the wheel rims 2 is preferably cast aluminum, and at the occasion of each of the spokes is provided with a bore 8 having a diameter proportioned to snugly receive the elongated spoke retainer nut 9 having a head 12 on one end and formed with appropriate flats 13 on the other end so that the nut 9 may be rotated by an appropriate wrench so that the threaded interior of the elongated nut 9 may threadably engage the threads 14 formed on the end of the spoke. At this end of the spoke, i.e., at the rim-end of each of the spokes, the bore 8 is enlarged to a bore 16 to receive the head 12, and after insertion of the spokes and assembly of the wheel by appropriate tensioning of the spokes, the bore 16 is filled with a silicone rubber sealant 17 which sealingly adheres to the walls of the bore and prevents the escape of air through the wheel rim.

At their inner ends, the array of spokes 6 and 7, each of which is preferably fabricated from electro-polished stainless steel, are provided, respectively, with anchor heads 18 and 19, formed integrally on shank portions 21 and 22, respectively, the heads and shank portions being peripherally anchored in a hub assembly designated generally by the numeral 23.

The hub assembly 23 comprises a central body portion 24 generally cylindrical in its configuration and provided with an internal bore 26 one end of which is open and the opposite end of which is closed by end wall 27. The end wall 27 is provided with equally spaced bores 28 as shown.

At one end, the body portion 24 of the hub is provided with an annular flange member 29 having a multiplicity of bores 31 formed therein through which extend the shank portions 21 of spokes 6, thus anchoring this end of each spoke to the hub assembly. While only one spoke 6 has been illustrated, it will of course be understood that there is a circular array of approximately 34 such spokes extending between the flange 29 and the wheel rim 2. At its opposite end, the hub body portion 24 is provided with a cylindrical flange 32 formed at the root of a radially extending flange 33 the outer end portion of which merges smoothly into a cylindrical flange section 34 as shown. The flange section 34 is circumferentially bored to provide a multiplicity of bores 36 to receive the shank portions 22 of spokes 7 in a continuous array containing 34 spokes. In the interest of clarity in the drawing, only two such spokes are shown. Preferably, the hub assembly 23 is cast from high density aluminum which provides the requisite strength while being light in weight. The hub assembly thus formed is appropriately centered with respect to the wheel rim 2 by the amount of tension imposed on the array of wire spokes 6 and 7.

To mount the wheel and hub assembly on a vehicle, an adaptor designated generally by the numeral 37 is provided. The adaptor includes a cylindrical body portion 38 closed at one end by an end wall 39 and open at its other end where it is provided with a radially extending flange 41. The central cylindrical body portion 38 of the adaptor is provided with an exterior periphery 42 machined to snugly compliment the inner periphery 26 of the hub, thus providing a motion-free yet detachable interconnection between the cylindrical body portion 38 of the adaptor and the generally cylindrical body portion 24 of the hub assembly. The adaptor 37 is detachably secured to the wheel mounting plate 43 by appropriate lug bolts 44 provided with lug nuts 46. The lug bolts 44 are pressed in the support plate 43 in the conventional fashion, and the shanks project through apertures 47 formed in the flange 41 of the adaptor. Obviously, the adaptor may be provided with apertures 47 arranged in whatever number is required by the different automobiles.

Once the hub assembly 23 is mounted on the adaptor, the hub assembly is detachably secured to the adaptor by means of lug bolts 48 adapted to threadably engage the end wall 39 in appropriately threaded bores 49. These lug bolts 48 are preferably high tensile steel, grade 8.8 or better, and are used in conjunction with a plate 51 apertured to compliment the bores 28 in the hub wall 27, and which functions to distribute the pressure imposed by the lug bolts 48 throughout the area of the end wall 27 in its abutment against the end wall 39 of the adaptor. The lug bolts thus not only retain the hub and adaptor assembled, they also function to carry torsional loads imposed between the hub and adaptor.

With the adaptor 37 thus assembled to the wheel support plate 43 or brake drum, whatever the case may be, and the hub and wheel detachably secured to the adaptor, all that remains is that the lug nuts 48 be concealed from view so as to make it more difficult for a would-be thief to steal the wheels. To this end, the end wall 27 of the hub is provided with a central bore 52, with the steel plate 51 being complimentarily bored, and the end wall 39 of the adaptor is provided with a threaded bore 53 which threadably receives a screw 54 which retains a cover plate or cap 56 having a radially outwardly extending portion 57 that impinges against the end of the flange portion 29 so as to cover and conceal the lug bolts 48. The cap 56 is centrally recessed to receive the screw 54, and the central recess is in turn covered by a removable emblem plate 58 suitably retained in the cap structure 56 by an O-ring 59 or other suitable fastening means such as a split spring ring (not shown).

Figure 2:
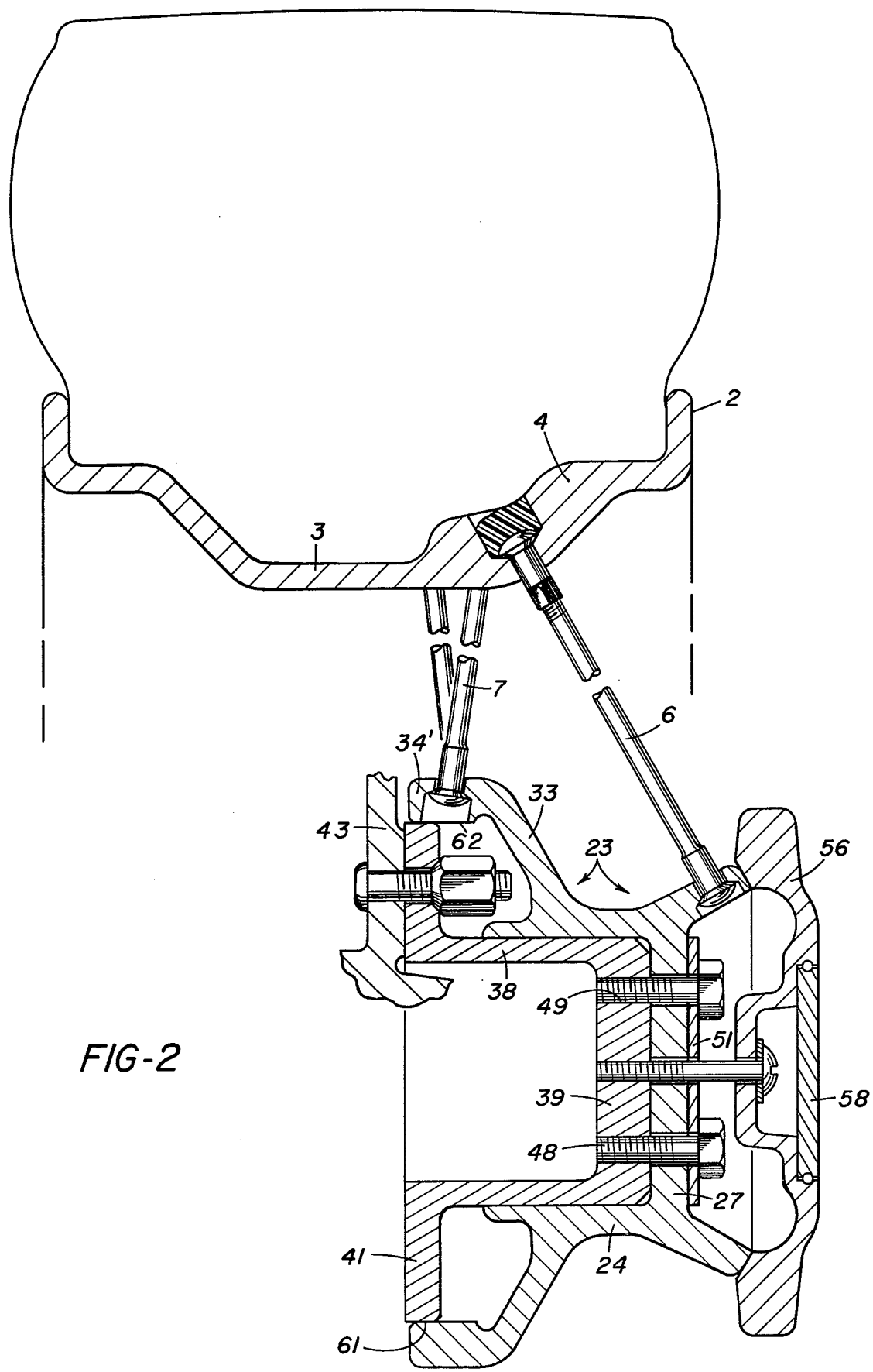
FIG. 2 is a view similar to FIG. 1 but showing a second embodiment in which a heavy duty hub assembly is depicted.

In the embodiment of the invention illustrated in FIG. 2, corresponding parts are indicated by the same reference numerals, and the only difference lies in the relationship of the flange 34' to the outer periphery 61 of the radially extending flange 41. As seen in FIG. 2, the inner periphery 62 of the cylindrical flange 34' is proportioned to bear snugly on the outer periphery 61 of the flange 41, thus providing an additional bearing support between the hub assembly 23 and the adaptor 37. It has been found that this additional bearing arrangement provides greater load bearing characteristics. In all other respects, the structure illustrated in FIG. 2 is the same as the structure illustrated in FIG. 1.

Having thus described the invention, what is considered to be new and novel and sought to be protected by letters patent of the United States is as follows:

I claim:

1. A wire spoke wheel and hub assembly, including an adaptor for mounting the wire spoke wheel on a conventional wheel support plate or brake drum comprising:

(a) a wheel rim;
(b) a hub concentrically disposed with respect to a wheel rim, said hub including a central body portion of relatively small diameter and spoke-anchoring flanges at opposite ends thereof of relatively larger diameter to which a multiplicity of spokes may be anchored, said central body portion including a centrally disposed cylindrical recess closed at one end by an end wall and open at its other end;
(c) a plurality of wire spokes detachably interconnected between the wheel rim and hub to retain the hub coaxially disposed with respect to the wheel rim;
(d) an adaptor including a central cylindrical body portion and a radially extending flange adapted to be detachably secured to a wheel mounting plate by appropriate lug bolts, said central body portion of said adaptor being proportioned to be snugly received in the interior of said central recess formed in the body of said hub; and
(e) means for detachably securing said hub to said adaptor to retain the wheel on a conventional wheel mounting plate or brake drum while functioning to carry torsional loads imposed between said hub and adaptor.

2. The combination according to claim 1, in which said wheel rim is fabricated from cast aluminum, said wire spokes are fabricated from stainless steel, said hub is fabricated from cast aluminum, and said adaptor is fabricated from steel.

3. The combination according to claim 1, in which one of said spoke-anchoring flanges of said hub snugly embraces the outer periphery of the radially extending flange on said adaptor whereby a portion of the lateral stresses imposed on said wheel rim during use are transferred directly to and sustained by the cylindrical body portion of the adaptor while another portion of the lateral stresses are transferred directly to and sustained by said radially extending flange on said adaptor.

4. The combination according to claim 1, in which said means for securing the hub to the adaptor comprises a plurality of lug bolts, a cover plate detachably secured to said adaptor to conceal said lug bolts, and a second plate detachably mounted on said cover plate for concealing the mounting means for said cover plate.

5. A wire spoke wheel and hub assembly, including an adaptor for mounting the wire spoke wheel on a conventional wheel support plate or brake drum comprising:

(a) a wheel rim;
(b) a hub concentrically disposed with respect to a wheel rim, said hub including a central body portion of relatively small diameter and spoke-anchoring flanges at opposite ends thereof of relatively larger diameter to which a multiplicity of spokes may be anchored, said central body portion including a centrally disposed cylindrical recess closed at one end by an end wall and open at its other end;
(c) a plurality of wire spokes detachably interconnected between the wheel rim and hub to retain the hub coaxially disposed with respect to the wheel rim;
(d) an adaptor including a central cylindrical body portion and a radially extending flange adapted to be detachably secured to a wheel mounting plate by appropriate lug bolts, said central body portion of said adaptor being proportioned to be snugly received in the interior of said central recess formed in the body of said hub; and
(e) means for detachably securing said hub to said adaptor to retain the wheel on a conventional wheel mounting plate or brake drum;
(f) said central cylindrical body portion of said adaptor being provided with an end wall, said end wall on the adaptor and the end wall on said hub being secured in tight contiguity when said wheel hub is mounted on said adaptor.

* * * * *